Sept. 4, 1934.  H. W. PLEISTER ET AL  1,972,715
BOLT ANCHOR
Filed Dec. 14, 1933  2 Sheets-Sheet 1
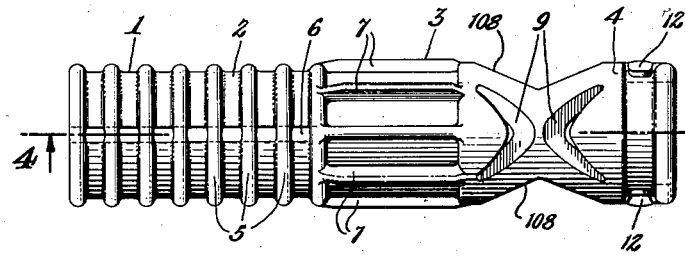
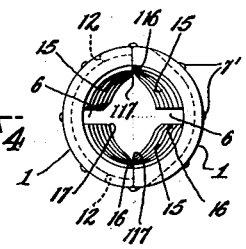
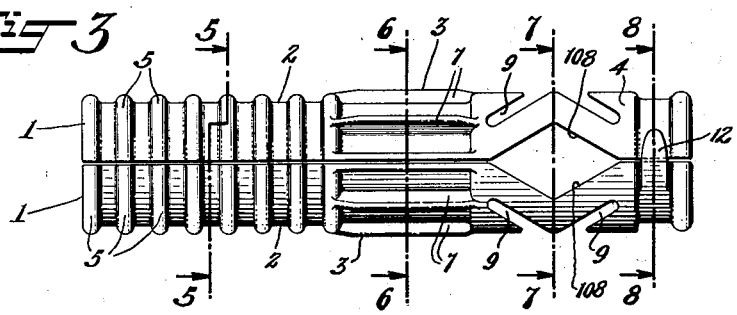
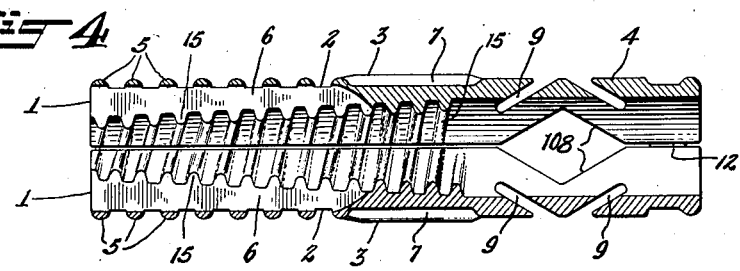
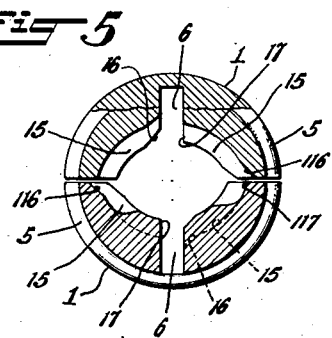
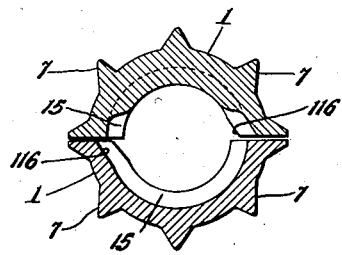
INVENTORS
Henry W. Pleister.
John Karitzky.
BY
ATTORNEY Sept. 4, 1934.  H. W. PLEISTER ET AL  1,972,715
BOLT ANCHOR
Filed Dec. 14, 1933   2 Sheets-Sheet 2
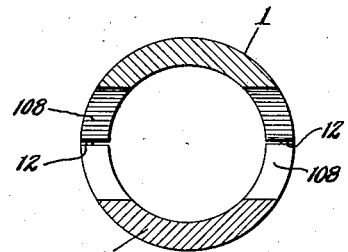
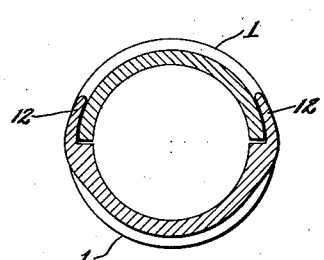
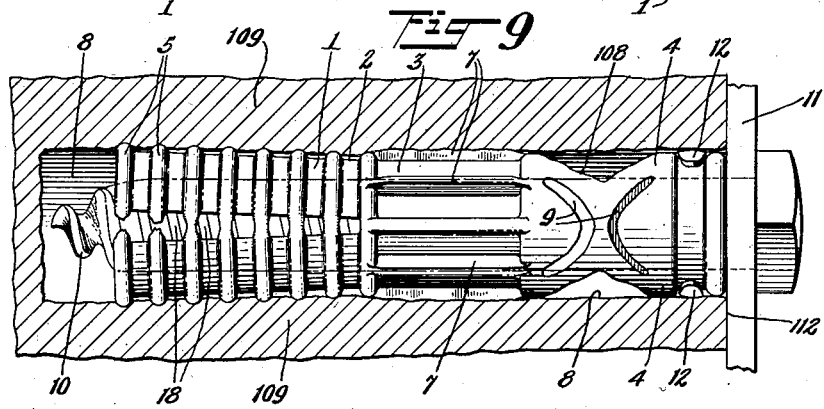
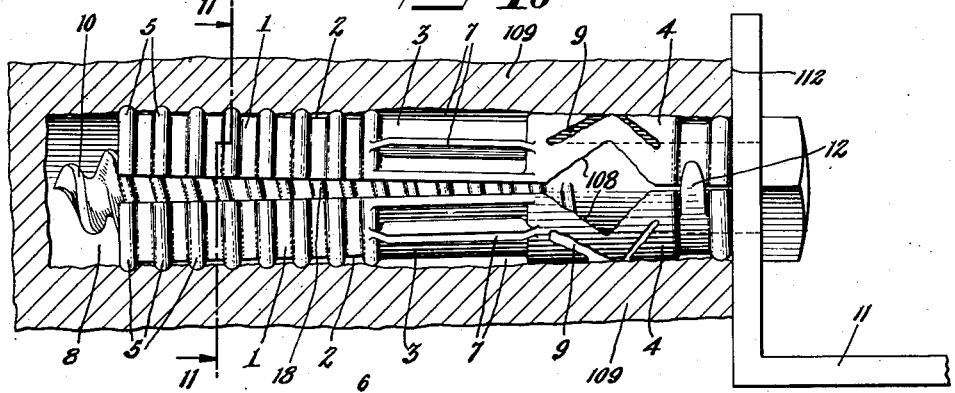
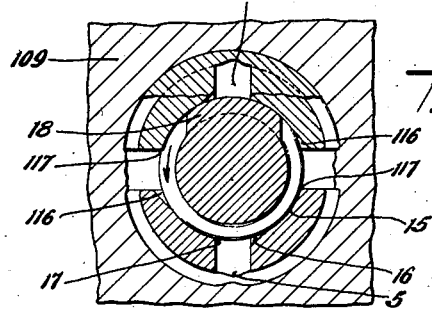
INVENTORS
Henry W. Pleister.
John Karitzky.
BY
Alanh Johnson
ATTORNEY

UNITED STATES PATENT OFFICE 1,972,715

BOLT ANCHOR

Henry W. Pleister, Westfield, and John Karitzky, Garwood, N. J., assignors to Henry B. Newhall Corporation, Garwood, N. J., a corporation of New Jersey Application December 14, 1933, Serial No. 702,274

11 Claims. (Cl. 85—2.4)

Our invention relates to bolt anchors.

Our invention further relates to a bolt anchor which is adapted to conform to the irregularities of the contour of the hole in the support, and insures the maximum grip or bond for any particular size of bolt anchor.

Our invention further relates to such a bolt anchor in which the maximum grip or bond will be towards the end of the hole, removed from the surface of the support, to prevent chipping or marring of the surface of the wall or other support.

Our invention further relates to a bolt anchor in which a lag, or other form of screw, can be readily screwed into the shield, but is prevented, or retarded, from accidentally working loose from the screw threads of the shield.

Our invention further relates to certain combinations, sub-combinations, articles of manufacture and details of construction, all of which will be more fully hereinafter described and pointed out in the claims.

In the figures we have shown one embodiment of our invention, the same reference numerals refer to similar parts of the several figures.

Fig. 1 is a plan view of one form of bolt anchor, made in accordance with our invention;

Fig. 2 is an end view, looking down the tapered bore of the bolt anchor;

Fig. 3 is a side elevation;

Fig. 4 is a vertical section on the line 4—4 of Fig. 1, looking in the direction of the arrows.

Fig. 5 is a cross-section on the line of 5—5 of Fig. 3;

Fig. 6 is a cross-section on the line of 6—6 of Fig. 3;

Fig. 7 is a cross-section on the line of 7—7 of Fig. 3;

Fig. 8 is a cross-section on the line of 8—8 of Fig. 3;

Fig. 9 is a plan view of our bolt anchor shown expanded in a wall or other support, and conforming to the irregularities of the contour of the hole in which it is mounted.

Fig. 10 is a side elevation of our bolt anchor expanded in the hole;

Fig. 11 is a cross-section, on an enlarged scale, on line 11—11 of Fig. 10, looking forward to the head of the bolt anchor as indicated by the arrows in Fig. 10.

Our invention relates to simplifying and cheapening the cost of manufacturing bolt anchors, and, at the same time, insuring the maximum grip or bond for any particular sized bolt anchor;

By our invention we cast or otherwise form our complete bolt anchor preferably, though not necessarily, in two sections 1, 1. Each section is preferably, though not necessarily, divided into three zones, 2, 3 and 4. Zone 2 is located at the inner end of the sections 1, 1 and is provided with exterior transverse rings or corrugations 5, 5. It is also provided with weakening members, preferably by casting or otherwise forming a weakening slot 6, which extends through the female screw thread 15 and the body of the inner end 2 to approximately the exterior rings or corrugations 5, 5.

These weakening slots extend to approximately the zone designated 3 which is cylindrical. On the exterior of this cylindrical zone 3 are mounted longitudinally extending anti-rotating ribs 7, 7 which extend up slightly above the rings or corrugations 5, 5, and prevent rotation of the bolt anchor in the hole 8 in a wall or other suitable support 109 (Fig. 9, Fig. 10) of brick, terra cotta, masonry, concrete or other suitable material. When the lag or other screw is first partially turned into the bolt anchor it causes a slight initial expansion which increases the diameter of the bolt anchor causing these longitudinally extending ribs 7, 7 to bite into the inner surface of the hole and secure the bolt anchor within the hole 8 so that further rotation of the lag, or other screw, will not rotate the bolt anchor.

The other zone 4 is preferably, though not necessarily, formed as weakend head members having weakened appertures 108 and cut away portions 9, 9, so that should a hole be poorly drilled, as for example not being quite long enough to seat the bolt anchor, the expanding lag, or other screw 10, will, as it is screwed home, cause the weakened head to collapse and shorten the bolt anchor to permit the work 11 to be brought up flush against the surface 112 of the wall or other suitable support 109, thereby enhancing the appearance of the job, giving a firmer bond, and preventing the work from teetering or pivoting on the bolt anchor.

While the head portions 4—4 of our bolt anchor are preferably formed as above described, they are not necessarily so formed.

This form of weakened head members, forming a collapsible throat, is described and claimed in U. S. Patent 1,878,600, patented November 20, 1932 to Henry W. Pleister, one of the joint inventors in this application.

Any suitable means are employed to hold and pivot the members 1—1 together, such as the ears or lugs 12—12 which are peened down into a cooperating groove 13, see Figs. 1, 2, 9, 10. These lugs 12—12 not only hold the two members 1—1 together for handling and transportation but permit them to pivot on each other while being expanded in the hole in the support, see Fig. 10.

Our bolt anchor in a perfectly drilled hole 8 may be expanded to obtain the maximum bond or grip without bending or breaking the exterior rings or corrugations 5—5. In a poorly drilled hole, or in a hole in which voids may occur so that the contour of the hole is irregular, one or more of the rings 5—5 may bend, or, in some cases, some of the rings may break and others may bend, or all may bend, or all may be broken, to permit the bolt anchor to contact with the interior surface of the hole 8, regardless of how irregular that surface may be, Fig. 9 and Fig. 10.

It will be noted that in the form shown by way of example there are two sections 1—1 and that each section is provided with a weakening slot 6, which, under extreme expansion, and extreme irregularity in the contour of the hole, will, when fully expanded permit the rings 5—5 to be severed and form the inner end of the bolt anchor into four expanding tines. This number, of course, may be varied by varying the number of weakening slots 6—6. Instead of the weakening slot 6—6 other forms of weakening slots may be employed.

Our invention also embodies a bolt anchor having an automatic lock formed by cooperating screw threads. By our invention the lag, or other expanding screw 10, can be freely screwed into the bolt anchor to cooperate with the female screw thread 15, Fig. 11.

In casting the weakening slots 6—6 we cast the female threads 15 so that where the weakening slots bi-sect the female thread 15, one of the corners 16 is eased off or cut away, while the other corner 17 of each weakening slot, Fig. 11, is left abrupt or sharp without any rounding or cutting away.

This insures easy insertion and expansion by the lag or other screw 10, having the male thread 18 because the male thread 18 slips by the eased off or cut away part 16 and engages with the female thread 15 at a point slightly removed from the weakening slot 6, Fig. 11. Therefore there will be no friction surface to bite into the male thread 18 as it passes the points 16—16, see our Fig. 11.

After the bolt anchor has been expanded in position it will be locked more or less securely in that position, because any retrograde movement of the screw 10, by jarring of the work 11, or jarring of the building, vibration, or other causes, will be resisted by the locking surfaces 17—17 bearing upon and biting, more or less, into the male thread 18 thereby preventing accidental unscrewing of the lag or other screw 10.

We also preferably provide the inner edges of the sections 1—1 with similar cut away edges 116, 116, the other edges 117, 117, Fig. 11 forming locking of biting surfaces in all respects the same as surfaces 16—16 and 17—17 respectively.

Of course the greater the expansion in the hole the greater the bond or grip will be, and greater the braking or locking of the surfaces 17—17 and 117, 117 with the male thread 18 of the lag or other screw 10.

Having thus described this invention in connection with an illustrative embodiment thereof, to the details of which we do not desire to be limited, what is claimed as new and what is desired to secure by Letters Patent is set forth in the appended claims.

What we claim is:

1. A new article of manufacture comprising a bolt anchor having a plurality of radially expansible members, having three zones, the first or exterior inner end of said members being provided with transverse rings or corrugations to insure increased holding power, the central zone being provided with longitudinally extending anti-turning ribs raised above the transverse rings or corrugations and the outer end zone with a weakened collapsible head adapted to permit work to be drawn up flush against the surface of the wall or other support.

2. A new article of manufacture comprising a bolt anchor formed of a plurality of rigid pivoted members said members at their inner ends having uninterrupted exterior transverse rings or corrugations, and weakening slots extending under one or more of the uninterrupted transverse rings or corrugations to permit the pivoted members to conform to the irregularities in the contour of the hole in the support.

3. A new article of manufacture comprising a bolt anchor formed of a plurality of rigid screw threaded pivoted members, said members at their inner ends being provided with exterior transverse rings or corrugations to insure increased holding power of the bolt anchor and also provided with one or more radially and longitudinally extending weakening slots adapted to permit the pivoted members to conform to the irregularities of the contour of the hole in the support.

4. A new article of manufacture comprising a bolt anchor formed of a plurality of separate rigid screw threaded pivoted members, said separate members at their inner ends being provided with exterior transverse rings or corrugations to insure increased holding power of the bolt anchor and also provided with one or more longitudinally extending weakening slots adapted to permit the rigid pivoted members to conform to the irregularities of the contour of the hole in the support, the said pivoted members being provided with longitudinally extending anti-turning ribs.

5. A new article of manufacture comprising a bolt anchor formed of a plurality of separate rigid screw threaded pivoted members, said separate members at their inner ends being provided with exterior transverse rings or corrugations to insure increased holding power of the bolt anchor and also provided with one or more longitudinally extending weakening slots adapted to permit the rigid pivoted members to conform to the irregularities of the contour of the hole in the support, the said pivoted members being provided with longitudinally extending anti-turning ribs, and weakened collapsible heads adapted to permit work to be drawn up flush against the surface of the wall or support.

6. A new article of manufacture comprising a bolt anchor formed of a plurality of rigid screw threaded pivoted members, said members at their inner ends being provided with exterior transverse rings or corrugations to insure increased holding power of the bolt anchor, and also provided with one or more longitudinally extending weakening slots extending radially through the screw threads adjacent to the transverse rings or corrugations to permit the rings or corrugations to bend, or break in whole or in part, as may be necessary, to have the bolt anchor conform to the irregularities in the contour of the hole in which it is mounted.

7. A new article of manufacture comprising a bolt anchor formed of a plurality of rigid screw threaded pivoted members, said members at their inner ends being provided with exterior transverse rings or corrugations to insure increased holding power of the bolt anchor, and also provided with one or more longitudinally extending weakening slots extending radially through the screw threads and through the shell or body portion of the bolt anchor, allowing only the exterior rings or corrugations to bridge the slots to permit the said rings or corrugations to bend, or break in whole or in part, as may be necessary to have the bolt anchor conform to the irregularities in the contour of the hole in which it is mounted; and longitudinally extending anti-turning ribs mounted on the exterior of said pivoted members.

8. A new article of manufacture comprising a bolt anchor formed of rigid sections, each section being provided with interrupted female screw threads, the interruptions in the female threads forming adjacent corners, one of the corners being cut away to permit an expanding screw to travel smoothly over the cut away corner and to seat itself in the female thread beyond the cut away corner.

9. A new article of manufacture comprising a bolt anchor formed of rigid sections, each section being provided with interrupted female screw threads, the interruptions in the female threads forming adjacent corners, one of the corners being cut away to permit an expanding screw to travel smoothly over the cut away corner and to seat itself in the female thread beyond the cut away corner, the other corner formed by the interruption in the female thread being left with a braking surface adapted to bite, more or less, into the thread of an expanding screw if said screw should accidentally move counter-clockwise, thereby acting as a safety device.

10. A new article of manufacture comprising a bolt anchor formed of rigid material and provided with interior screw threads, means forming part of the screw threads to permit ready insertion of an expanding screw to expand the bolt anchor, said means also adapted to prevent or retard accidental unscrewing of an expanding screw.

11. The combination in a bolt anchor of a plurality of rigid pivoted screw threaded members provided on the exterior inner end with transverse rings or corrugations to insure increased holding power, the central portions of said pivoted members being provided with longitudinally extending anti-turning ribs, said pivoted members being provided with longitudinally extending weakening slots extending radially through the screw threads of said members adjacent to the rings or corrugations forming corners in the screw threads, one of the corners being reduced in height to permit an expanding screw to be readily screwed into the bolt anchor, the other corner of the interrupted screw thread adapted to act as a lock and bear on, or bite into, the male thread of the screw on any retrograde movement of said expanding screw, and a screw to expand the bolt anchor.

HENRY W. PLEISTER.
JOHN KARITZKY.